Figure 6:
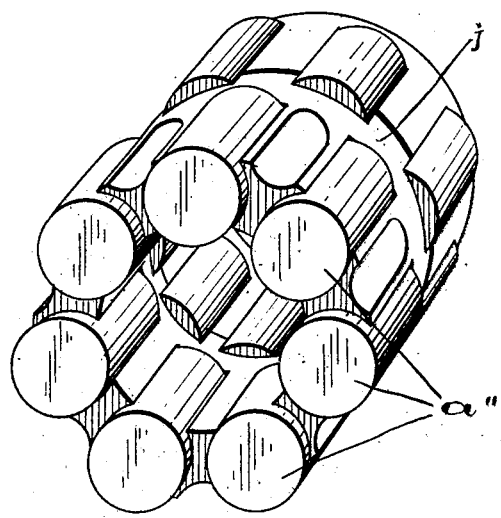

No. 854,573. PATENTED MAY 21, 1907.
T. FOX.
ANTIFRICTION BEARING.
APPLICATION FILED SEPT. 12, 1906.
2 SHEETS—SHEET 1.
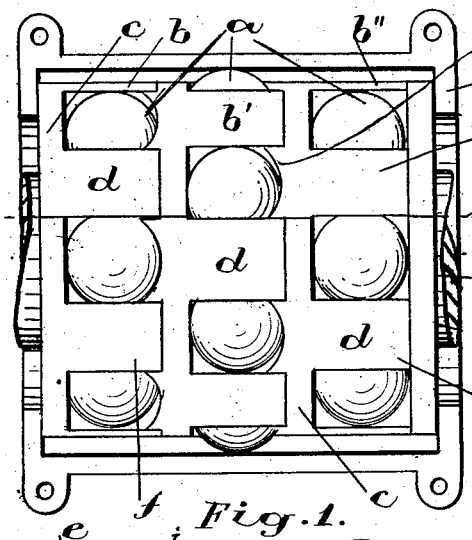
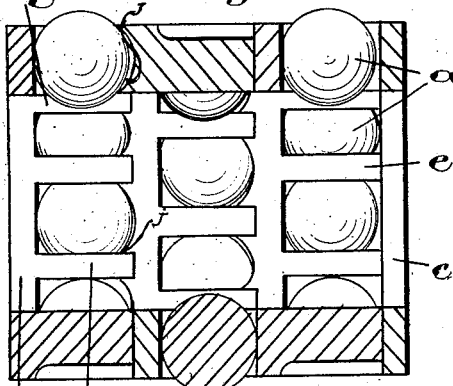
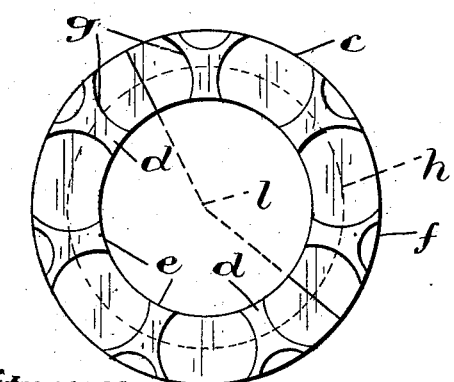
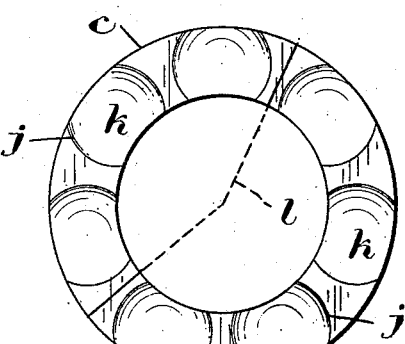

No. 854,573. PATENTED MAY 21, 1907.
T. FOX.
ANTIFRICTION BEARING.
APPLICATION FILED SEPT. 12, 1906.

2 SHEETS—SHEET 2.

UNITED STATES PATENT OFFICE.

TOBIAS FOX, OF TORONTO, ONTARIO, CANADA.

ANTIFRICTION-BEARING.

No. 854,573.

Specification of Letters Patent.

Patented May 21, 1907.

Application filed September 12, 1906. Serial No. 334,349.

*To all whom it may concern:*

Be it known that I, TOBIAS FOX, of the city of Toronto, in the county of York and Province of Ontario, Canada, have invented certain new and useful Improvements in Antifriction-Bearings; and I hereby declare that the following is a full, clear, and exact description of the same.

This invention relates to an anti-friction bearing comprising one or more groups of anti-friction bearing members, such as balls or rollers, maintained in an annular formation by peculiarly constructed retaining cages arranged to permit of the individual revolution of the anti-friction bearing members, and prevent their radial and lateral displacement either individually or collectively.

It further relates to the peculiar manner of assembling the retaining cages, so that the anti-friction bearing members of one group will be opposed to the intervals between the anti-friction bearing members of the adjacent group or groups to provide a continuous support for the coacting part at a place diametrically opposite the application of the load.

For a full understanding of the invention reference is to be had to the following description and to the accompanying drawings in which, Figure 1, is a plan view of an anti-friction bearing showing three groups of anti-friction balls. Fig. 1ᵃ, is an end elevation of the same. Fig. 2, is a sectional view taken centrally through the same. Fig. 3, is a plan view of one of the retaining cages, shown in the preceding figures with the anti-friction balls removed. Fig. 4, is an elevation of one of the retaining cages looking at it from the open end. Fig. 5, is an elevation of the same retaining cage, as shown in Fig. 4, looking at it from the closed end, and Fig. 6, is a perspective view of an anti-friction bearing in which anti-friction rollers are substituted for the anti-friction balls, shown in the preceding views.

Like letters of reference refer to like parts throughout the specification and drawings.

The anti-friction bearing shown in Figs. 1 to 5 inclusive, consists of three groups of anti-friction balls $a$, maintained in their annular formation by annular retaining cages $b$, $b'$ and $b''$ respectively. Each of the retaining cages consists of an annular cage ring $c$ having a central bore therethrough, and a series of equi spaced trundles $d$ extending laterally from one of the side faces of the cage ring, and slightly longer than the diameter of the anti-friction balls $a$.

The planes of the inner face $e$ and outer face $f$ of the trundles are concentric with the axis of the cage rings, and their side faces are of spherical shapes corresponding to the spherical surfaces of the anti-friction balls so that one will offer a substantial contact to the other, and provide for the free revolution of the latter.

By reference to Fig. 4, it will be seen that on the dotted line $h$, indicating the centers of the anti-friction balls $a$, the distance between the opposite side faces $g$ of two adjacent trundles is slightly greater than the diameter of the anti-friction ball contained between them, and that the distance between the same side faces at the inner and outer surfaces of the trundles is less than the diameter of the anti-friction ball to provide for the free revolution of the latter between them and to prevent its radial displacement, the former function being attained by the fact that the curvature of the pocket formed by the side faces of the trundles corresponds to the curvature of the anti-friction ball, and the latter by reason of the fact that the width of the openings between the side faces of the trundles is less than the diameter of the anti-friction ball. By means of this construction, the ball is retained in a pocket which presents no obstruction to its free revolution, and yet prevents its displacement radially in either direction so that while it will be permitted to perform its function of providing an anti-friction bearing for the coacting member $i$, it will be prevented from becoming displaced therefrom, and will also be prevented from contacting the adjacent ball on either side of it, which is of material advantage to the anti-friction bearing in event of damage to any of the anti-friction balls.

As shown in Fig. 1, the anti-friction balls $a$ contained in the retaining cage $b'$ are opposed to the intervals between the anti-friction balls contained in the retaining cages $b$ and $b''$. This construction is effected by providing the cage rings $c$ at the opposite side face to the trundles $d$ with detents $j$ to enter the spaces between the trundles $d$ of the next adjacent cage ring and shaping the side faces of the detents $j$ to correspond with the side faces of the trundles so as to provide not only for the entry of the detents $j$ into the spaces between the trundles $d$ but also to provide for the entry of the trundles $d$ into the spaces existing between the detents, and enable the ends of the trundles to contact the adjacent surface of the cage ring.

It will be seen by reference to Figs. 2 and 5, that the surface $k$ of each of the detents $j$ which contacts the anti-friction ball, is substantially cup-shaped and the distance between the cup-shaped surface $k$ and the adjacent surface of the cage ring is but slightly greater than the diameter of the ball, so that the ball will be permitted to freely revolve between them, and will be prevented from moving laterally except for an exceedingly limited distance.

In Fig. 6, anti-friction bearing rollers $a''$ are substituted for the anti-friction balls shown in the preceding views. In this case the roller pockets are shaped to correspond with the rollers both as regards their sides and ends, but otherwise the construction of the retaining cages and the arrangement of the parts are the same as described and shown in the preceding figures.

For convenience in fitting the anti-friction bearing on a journal, the retaining cages $b$, $b''$ are divided on the dotted line $l$ which passes through two of the detent teeth on either a straight or broken line radial to the center of the retaining cage.

To assemble the anti-friction balls and retaining cages the latter are placed so that the cage rings will assume a substantially horizontal plane, and the trundles will assume a substantially vertical plane. The anti-friction bearing members are then dropped into the pockets formed by the curved faces of the trundles.

In placing the anti-friction bearing on the co-acting member, the sections of the retaining cages are separated and placed around the opposite sides of the co-acting member $i$ and then closed together. If one or more groups of the anti-friction bearing members are employed in the bearing, the groups are arranged as shown in Figs. 1 and 6, and the group or series of groups are placed in a divided bearing box $m$ similar to that shown in the drawings. As the bearing box does not form a material part of the invention and as any style of a bearing box can be employed in combination with the anti-friction bearing, it will not be necessary to describe it in detail further than to say that the two sections of the bearing box $m$ when bolted together securely maintain the retaining cage sections in their assembled position and prevent their displacement either radially or laterally on the co-acting member.

Having thus fully described my invention what I claim as new and desire to secure by Letters Patent is:

1. An anti friction bearing comprising a retaining cage, consisting of a series of annular cage rings of corresponding diameters, and arranged in parallel planes, and having alined annular bores of the same diameter, trundles projecting laterally from the side faces of the cage rings, and equi-spaced to form intervening pockets of slightly greater width than the diameter of the anti friction bearing elements to be contained between them, and having their opposite faces converging to prevent the inward radial displacement of the anti friction bearing elements, and having the trundles of one cage ring arranged opposite the pockets of the next adjacent cage ring.

2. An anti-friction bearing comprising a retaining cage, consisting of an annular cage ring having a central bore therethrough, a series of trundles projecting laterally from one face of the cage ring and spaced from one another by intervening pockets of slightly greater width than the diameter of the anti-friction bearing elements which they are to contain, and having their opposite faces curved to correspond with the curvature thereof, and detents projecting from the other face of the cage ring correspondingly shaped to the opposite faces of the trundles and separated by intervening unoccupied intervals to receive therein the trundles of the next adjacent retaining cage.

3. An anti-friction bearing comprising a series of retaining cages, each consisting of an annular cage ring having a central bore therethrough, a series of trundles projecting laterally from one face of each cage ring and equi spaced to form intervening pockets of slightly greater width than the diameter of the anti-friction bearing elements to be contained between them, and having their opposite faces curved to correspond with the curvature thereof, detents on the other face of each cage ring having their faces correspondingly shaped to the opposite faces of the trundles, and arranged with unoccupied spaces between them to receive the ends of the trundles and cause the retaining cages to be assembled so that the anti-friction bearing elements of one group will be alined opposite the spaces between the anti-friction bearing elements of the adjacent group or groups, and anti-friction bearing elements contained in the pockets formed by the annular rings, trundles, and detents.

Toronto, Ontario, August 22nd, 1906.

TOBIAS FOX.

Signed in the presence of—
  CHAS. H. RICHES,
  H. L. TRIMBLE.